United States Patent [19]
Katsman et al.

[11] Patent Number: 6,139,498
[45] Date of Patent: Oct. 31, 2000

[54] ULTRASOUND SYSTEM PERFORMING SIMULTANEOUS PARALLEL COMPUTER INSTRUCTIONS

[75] Inventors: Igor Katsman; Menachen Halmann; Evgeny Drapkin, all of Haifa, Israel

[73] Assignee: GE Diasonics Israel, Ltd., Tirat Hacarmel, Israel

[21] Appl. No.: 09/222,513

[22] Filed: Dec. 29, 1998

[51] Int. Cl.$^7$ ........................................................ A61B 8/00
[52] U.S. Cl. .............................................................. 600/443
[58] Field of Search ................................... 600/437, 443; 700/703, 705

[56] References Cited

U.S. PATENT DOCUMENTS

| | | | |
|---|---|---|---|
| 5,212,777 | 5/1993 | Gove et al. | 395/375 |
| 5,563,810 | 10/1996 | Cherry et al. | 364/571.04 |
| 5,598,545 | 1/1997 | Childers et al. | 395/562 |
| 5,904,652 | 5/1999 | Gilbert et al. | 600/447 |
| 5,910,117 | 6/1999 | Basoglu et al. | 600/454 |
| 5,971,923 | 10/1999 | Finger | 600/437 |

*Primary Examiner*—Francis J. Jaworski
*Attorney, Agent, or Firm*—McAndrews Held and Malloy; Christian G. Cabou; Phyllis Y. Price

[57] ABSTRACT

An ultrasound system comprises a front end subsystem and a back end subsystem. The back end subsystem processes data samples representative of the echo signals from the front end subsystem. The back end subsystem includes at least one microprocessor with registers that simultaneously store at least two data samples. The microprocessor performs parallel common arithmetic or logic instructions upon at least two ultrasound data samples in one register. The microprocessor may be configured to scan convert polar data samples to Cartesian pixel values. During scan conversion, one register simultaneously stores multiple polar data samples and another register simultaneously stores coefficients associated with the polar data samples. The microprocessor multiplies corresponding data samples and coefficients, and sums the product of the parallel multiplication operations in order to produce a Cartesian data sample associated with a pixel to be displayed on an image arranged in a Cartesian coordinate pattern. The microprocessor may be configured to perform parallel arithmetic instructions to carry out auto-correlation operations, such as during Color Doppler signal processing. To do so, the registers store simultaneously multiple data samples representative of echo signals received from the same physical point from several transmissions. The registers each store the same data samples except that the data samples are shifted in the registers with respect to one another. During the parallel common arithmetic instructions, the microprocessor multiplies the data samples within the first and second registers and sums the products of the multiplication operations as part of an autocorrelation operation. The microprocessor may be reconfigured to perform blending operations two-dimensional greyscale images (B-mode) and Color Doppler images for a region of interest.

39 Claims, 4 Drawing Sheets

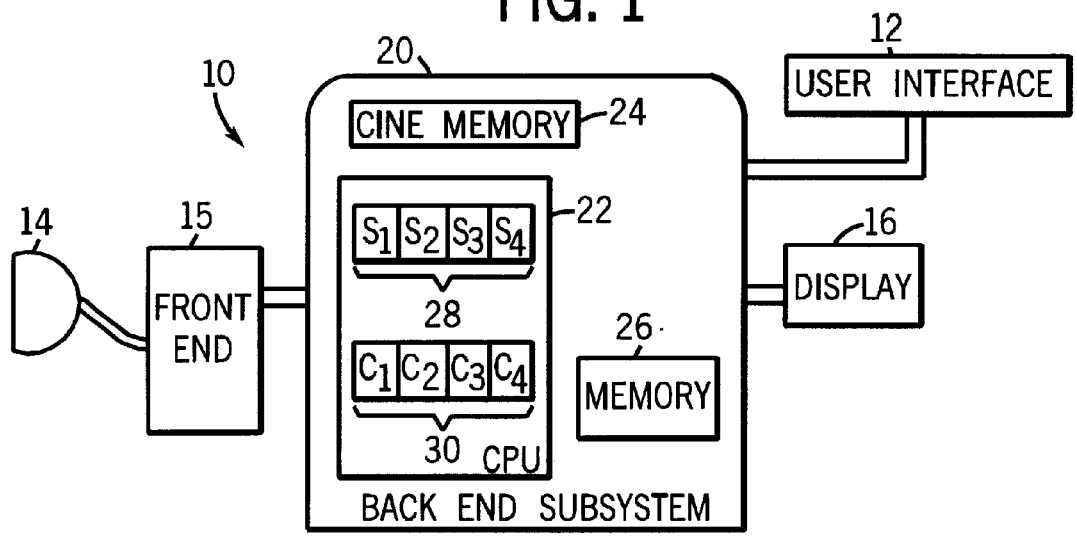
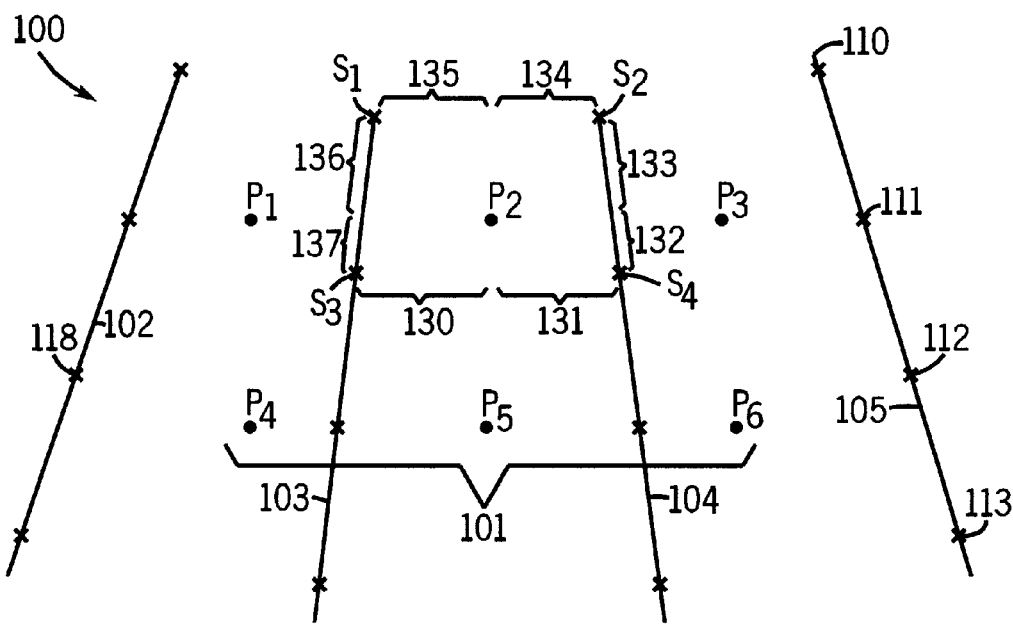

ULTRASOUND SYSTEM PERFORMING SIMULTANEOUS PARALLEL COMPUTER INSTRUCTIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention generally relates to an ultrasound system and in particular to an ultrasound diagnostic system that instructs at least one processor to perform parallel arithmetic or logic instructions upon multiple ultrasound data points simultaneously during one clock cycle.

Ultrasound systems have been used for many years in the field of radiology by physicians to examine various areas of humans, such as the heart, a fetus, arteries, organs and the like. Ultrasound systems typically include two primary subsystems, a front end subsystem and a back end subsystem. The front end subsystem includes one or more ultrasound probes for scanning an area of interest within a patient. Conventional front end subsystems also include a beamformer hardware unit that enables transmission of ultrasound signals into the patient and acquires ultrasound echo signals therefrom. The front end subsystem passes acquired echo signals to the back end subsystem which performs signal processing upon the acquired echo signals. The back end subsystem converts the processed echo signals to a format displayable on a CRT and displays the echo signals in a desired format, such as a graph, a two-dimensional image, a three-dimensional image, a black and white image of anatomic structure (B-mode image), a colorized image of moving tissue or moving fluid, and the like.

In the past, the front and back end sections of ultrasound systems were constructed in a hardware intensive manner utilizing multiple hardware boards, each board of which performed predetermined dedicated ultrasound operations. In past ultrasound systems, dedicated hardware boards were included to perform signal processing and separate dedicated hardware boards were provided to perform scan conversion. Scan conversion includes the task of translating the incoming data from a beam coordinate space, usually polar, to Cartesian coordinate space. In addition, past ultrasound systems required a separate central processor to control the various dedicated hardware boards. The central processor did not perform signal processing or scan conversion operations. Instead, the central processor primarily performed system control operations, such as setup to configure the hardware boards when the system was first turned on and management of the dedicated hardware boards throughout operation.

Ultrasound systems have been proposed which utilize digital signal processors (DSP) to carry out signal processing and scan conversion. One or more DSPs cooperate to perform signal processing. The DSPs dedicated to signal processing are housed as a set on one or more printed circuit boards. A separate set of DSPs housed on a separate set of printed circuit boards are programmed to perform scan conversion. However, even in systems using DSPs, each set of DSPs is dedicated to specific processing operations. Hence, a DSP configured to perform Doppler signal processing cannot perform scan conversion. In addition, ultrasound systems which utilize DSPs continue to require a separate central CPU to maintain system control.

More recently, in the early 1990s, the assignee of the present application introduced ultrasound systems based on the architecture of a personal computer (PC). These ultrasound systems were referred to under the trademarks and tradenames, ESI5000™ and Synergy™. The ESI5000™ and Synergy™ ultrasound systems included DSP boards for signal processing and a central processor for controlling overall operation of the ultrasound system. The central processor of the PC was used to carry out setup operations and to control the DSP boards. The central CPU in the Synergy™ system also performed scan conversion of Color Doppler images from polar coordinates to Cartesian coordinates. Also, the ESI5000™ and Synergy™ systems utilized a front end subsystem having separate beamformer hardware.

However, conventional ultrasound systems have experienced limitations. In particular, conventional ultrasound systems require individual processors or DSPs to process data sequentially. For example, in a conventional ultrasound system, a processor or DSP may be dedicated to perform scan conversion operations. The dedicated processor or DSP receives a sequence of data samples associated with a scan of the patient. The dedicated processor or CPU performs a sequence of arithmetic operations to convert the ultrasound data samples from a polar coordinate system (as utilized when scanning a patient) to a Cartesian coordinate system (as utilized to display image information). In the past, the dedicated processor or CPU performed the arithmetic operations necessary for scan conversion in a sequential fashion. Sequential processing of the data samples reduces the systems operating speed and creates "bottle necks" within the overall ultrasound processing sequence. Consequently, sequential processing has resulted in a limitation upon the performance of conventional ultrasound systems.

A need remains for an improved ultrasound system to overcome the above-identified difficulties. It is an object of the present invention to meet this need.

SUMMARY OF THE INVENTION

It is an object of the preferred embodiment of the present invention to provide an ultrasound system with increased processing speed.

It is a further object of the preferred embodiment of the present invention to provide an ultrasound system which avoids the need for custom processors or DSPs for carrying out ultrasound operations such as scan conversion, beam forming, signal processing, vector processing, blending of 2D and color images, 3D volume rendering, color threshold operations and the like.

It is a further object of the preferred embodiment of the present invention to provide a high-speed personal computer based ultrasound system capable of utilizing a common set of multiprocessors to perform ultrasound operations such as scan conversion, beam forming, signal processing, vector processing, blending, volume rendering and the like, which were heretofore carried out by dedicated DSPs and hardware boards.

It is a further object of the preferred embodiment of the present invention to provide an ultrasound system which minimizes bottlenecks in the ultrasound processing operations.

It is a further object of the preferred embodiment of the present invention to provide an ultrasound system having the ability to perform parallel arithmetic or logic instructions in a single CPU upon multiple data points, such as during scan conversion, signal processing, beam forming, 2D/color image blending, 3D volume rendering, color thresholding and the like.

It is another object of the preferred embodiment of the present invention to provide an ultrasound system which avoids the need for separate processors and DSPs for each type of ultrasound operation.

It is a corollary object of the preferred embodiment of the present invention to provide an ultrasound system having the ability to reconfigure a processor during operation in real time to accommodate different data types in order to utilize a single processor for various operations.

It is a further corollary object of the preferred embodiment of the present invention to provide an ultrasound system having the ability to reconfigure a processor in real time to accommodate different data types when performing parallel arithmetic or logic instructions upon multiple data sets.

It is yet another object of the preferred embodiment of the present invention to provide an ultrasound system having at least one processor capable of performing parallel arithmetic instructions upon multiple ultrasound data points, where the type of data received by the processor varies between consecutive parallel arithmetic or logic instructions.

These and other objects of the preferred embodiment of the present invention are provided by an ultrasound system comprising a front end subsystem and a back end subsystem. The front end subsystem transmits ultrasound signals to an area of interest and receives echo signals therefrom. The back end subsystem processes data samples representative of the echo signals from the front end subsystem. The back end subsystem includes at least one microprocessor for processing the data samples to produce an ultrasound image of the area of interest. The microprocessor has multiple registers, at least one of which simultaneously stores at least two data samples. The processor performs parallel common arithmetic or logic instructions upon at least two ultrasound data samples in one register. Each register may be configured to store one of several data types. For example, the data types may include eight 8 bit data samples, four 16 bit data samples and two 32 bit data samples. Optionally, larger or smaller registers may be used. Larger registers will improve performance and the parallel processing of data.

In an alternative embodiment, the ultrasound system includes first and second registers configured to perform scan conversion. The first register simultaneously stores at least two polar data samples representative of echo signals obtained from a sector scan of an area of interest arranged according to a polar coordinate system. The second register simultaneously stores at least two numeric coefficients associated with the two data samples stored in the first register. During the parallel common arithmetic instruction, the processor multiplies corresponding data samples and coefficients in the first and second registers, respectively, and sums the products of the parallel multiplication operations in order to produce a Cartesian data sample associated with a pixel to be displayed on an image arranged in a Cartesian coordinate pattern.

In an alternative embodiment, the ultrasound system configures the microprocessor to perform parallel arithmetic instructions to carry out auto-correlation operations, such as Color Doppler signal processing. To perform auto-correlation, the microprocessor first configures internal registers to store simultaneously multiple data sets representative of echo signals received from the same physical point during several successive transmissions. The internal registers each store the same data, except that the data sets within a second register are shifted with respect to the position of the same ultrasound data sets stored in a first register. During the parallel common arithmetic instructions, the microprocessor multiplies the data sets within the first and second registers and sums the products of the multiplication operations as part of an autocorrelation operation.

BRIEF DESCRIPTION OF THE DRAWINGS

FIG. 1 illustrates an ultrasound system according to a preferred embodiment of the present invention.

FIG. 3 illustrates a portion of a polar coordinate sector scan overlaid with a portion of a Cartesian coordinate pixel array in connection with a scan conversion operation carried out by an ultrasound system according to a preferred embodiment of the present invention.

DETAILED DESCRIPTION OF THE PREFERRED EMBODIMENT

Figure 2:
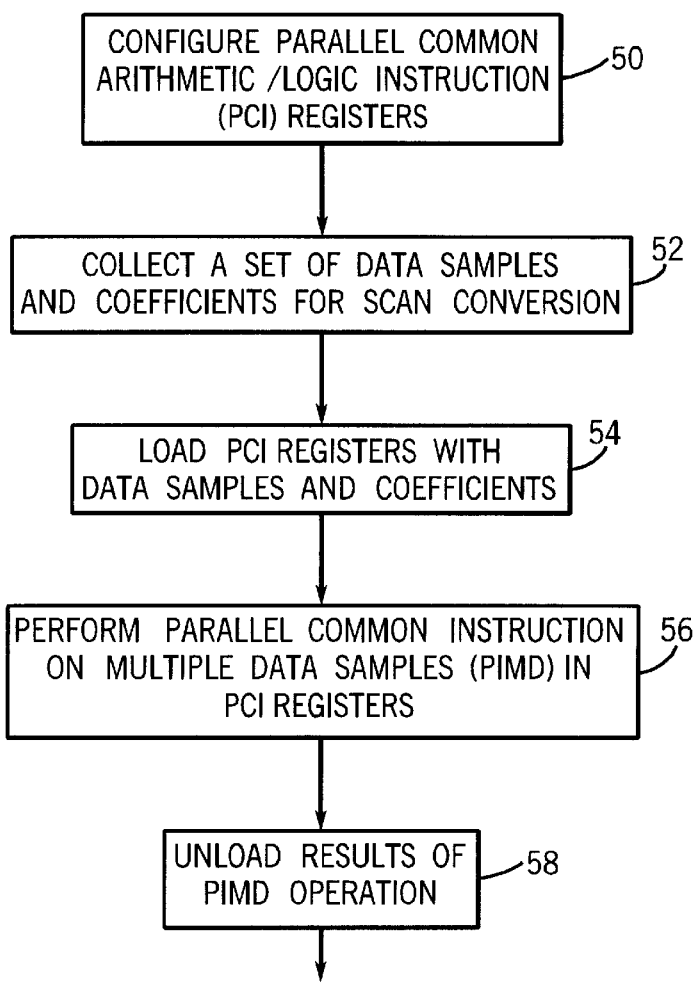
FIG. 2 illustrates an exemplary processing sequence carried out by an ultrasound system according to a preferred embodiment of the present invention to perform parallel common arithmetic instructions upon multiple ultrasound data samples.

FIG. 1 illustrates an ultrasound system 10 according to a preferred embodiment of the present invention. The ultrasound system 10 includes a user interface 12, a front end subsystem 15 having at least an acoustic power unit (not shown) to power a probe 14, a display 16 and a back end subsystem 20. The back end subsystem may be implemented in a personal computer. Optionally, the front end subsystem 15 may include a beamformer (not shown). Alternatively, the beamformer may be removed from the front end system 15 and implemented in software within the back end system 20. The user interface 12 permits users to interact with the ultrasound system 10, such as through the entry of patient information, selection of operating modes and selection of parameters. The probe 14 transmits and receives ultrasound signals to and from an area of interest in a patient. The transmitted ultrasound signals are focused and steered to focal zones alone vectors or scan lines which combine to form an area of interest. Transmitted ultrasound signals are focused and steered by the beamformer based upon the mode of operation and the user selected parameters. The probe 14 receives echo signals from the area of interest. The echo signals may be examined by the ultrasound system for intensity information, Doppler information and the like. The front end subsystem 15 collects ultrasound data sets representative of the echo signals for each frame or scan of an area of interest. The front end subsystem 15 passes the sets of data samples to the back end subsystem 20 where the data sets are stored in memory 24 and later processed to present ultrasound diagnostic image information. By way of example only, the data sets may be digitized representations of the echo signal.

The terms data samples, data sets and digitized echo signals are collectively referred to throughout as "data points."

The back end subsystem 20 includes at least one CPU 22, Cine loop memory 24 and memory 26. The memory 26 may be configured to include an accumulator buffer (not shown) and image port memory (not shown). The accumulator buffer and image port memory may be omitted and the memory 26 may be configured to include segments dedicated to storage of data sets from the front end subsystem 15 or to be displayed.

The CPU 22 is a conventional processor having registers 28 and 30 configured to enable the processor to carry-out parallel common arithmetic OR LOGIC instructions (PCI) upon at least two data values. The CPU 22 may have one or more registers 28 or 30. By way of example only, one type of processor having an architecture that supports parallel common arithmetic instructions is referred to under the trademark Multi-Media Extension (MMX™), a trademark of Intel Corporation. The MMX™ capability is offered with processors such as the Pentium™ and Pentium/II™ processors offered by Intel Corporation. The PCI capability enables the CPU to perform parallel simultaneous arithmetic or logic instructions, such as the "single instruction on multiple data" (SIMD™) capability offered by the Pentium™ and Pentium Pro™ processors. Examples of logic instructions are EQUAL, NOT EQUAL, GREATER THAN and the like. Processors having the PCI capability typically include a set of multibit registers (e.g., a set of eight 64 bit registers) which may be configured to accommodate different data types. For instance, the multibit registers may be configured each to accommodate one 64 bit quad word. Alternatively, the registers may be configured each to receive two 32 bit double words, four 16 bit words or eight 8 bit bytes.

The PCI capability enables a processor to perform arithmetic instructions upon multiple data values in parallel (i.e., simultaneously). For instance, a processor offering a PCI capability may perform multiple add, subtract or multiply instructions upon a group of data values stored in the registers during a single clock cycle. By way of example only, an instruction such as "PMUL W r1 r2" instructs the processor to configure two PCI registers therein, each to hold four 16 bit words. The data samples are loaded into the four 16 bit word portions of the PCI registers r1 and r2 and, during a single clock cycle, the content of registers r1 and r2 are multiplied and added in a desired manner according to the instruction PMUL.

FIG. 2 illustrates the processing sequence carried out by the back end subsystem 20 according to a preferred embodiment of the present invention utilizing the PCI registers 28 and 30 of the CPU 22 during ultrasound processing. Beginning at step 50, before an ultrasound operation, the CPU 22 configures the registers 28 and 30. The registers 28 and 30 are configured to accommodate a desired data type depending upon the ultrasound operation to be carried out by the CPU 22. For example, if registers 28 and 30 are 64 bit registers then the configuration step 50 may include configuring registers 28 and 30 each to receive one 64 bit quad word, or two 32 bit double words or four 16 bit words, or eight 8 bit bytes. Next, the back end subsystem 20 collects a set of ultrasound data samples from memory 26 to be loaded into the PCI registers 28 and 30 (step 52). In step 54, the back end subsystem 20 packs the PCI registers 28 and 30 with a set of ultrasound data samples. At step 56, the CPU 22 performs parallel common arithmetic instructions upon the ultrasound data samples stored in the PCI registers 28 and 30. At step 58, the back end subsystem 20 unpacks or unloads the results of the parallel common arithmetic instructions from the PCI registers 28 and 30.

Next, an exemplary ultrasound operation is described according to a preferred embodiment of the present invention in connection with FIGS. 1–3, whereby the ultrasound system 10 performs a scan conversion operation utilizing the PCI registers 28 and 30 of the CPU 22.

FIG. 3 illustrates a portion of a sector scan 100 overlaid with a subset of pixels within a video display. The sector scan 100 comprises a plurality of beams or scan lines 102–105. Each beam or scan line 102–105 is produced by focusing and steering the energy transmitted from the probe 14 at a desired steering angle and to a desired focal depth. Each beam or scan line 102–105 is divided into a plurality of focal zones from which one or more data samples are collected, such as ultrasound data samples 110–113. Each data sample 110–113 is identified by amplitude and phase information received in a set of echo signals reflected from the zone surrounding of the data samples 110–113 within the area of interest in the sector scan 100. The echo signals are digitized to form data sets. The data sets are signal processed to form data samples.

The data samples 110–113 within each of scan lines 102–105 are arranged within a polar coordinate system wherein the origin is located at the surface of the transducer probe 14. Each data sample 110–113 is uniquely located in space within the sector scan 100 based upon the steering angle and the distance from the transducer probe 14. A subset of pixels 101 from a display are superimposed upon the sector scan 100 to illustrate a scan conversion operation as performed by CPU 22. The subset of pixels 101 includes pixels P1–P6 which are arranged in a Cartesian coordinate system along horizontal and vertical axes.

During operation, the front end subsystem 15 collects data samples S1–S4 from scan lines 103 and 104 and passes the data samples S1–S4 to the back end subsystem 20. The data samples S1–S4 are stored in memory 26. The data samples S1–S4 are combined, according to a scan conversion operation, to form a single data value for pixel P2 which is displayed on the display 16. Pixel P2 is spaced horizontal and vertical distances 130–137 from data samples S1–S4 as illustrated in FIG. 3. For instance, pixel P2 may be located a horizontal distance 131 and a vertical distance 132 from data sample S4. Pixel P2 may be located a horizontal distance 135 and a vertical 136 from data sample S1. The value for pixel P2 is influenced to differing degrees by the values for data samples S1–S4. The distances 130–137 determine the extent to which data samples S1–S4 impact the amplitude of the value of pixel P2. For instance, if pixel P2 is closer to data sample S4 than to data sample S1, the amplitude of data sample S4 would have a greater influence over the value of pixel P2. To calculate the value of pixel P2, during scan conversion, each of samples S1–S4 are multiplied by coefficients C1–C4 and the products thereof are then summed according to the following equation:

$$P2 = S1*C1 + S2*C2 + S3*C3 + S4*C4.$$

The coefficients C1–C4 are determined before processing based on the position of pixel P2 relative to a corresponding set of four data samples S1–S4.

During a scan conversion operation, the back end subsystem 20 configures at least PCI registers 28 and 30 to operate simultaneously upon four separate data samples. By way of example only, each data sample S1–S4 may be a 16 bit word and PCI registers 28 and 30 may be each 64 bit registers. The back end subsystem 20 configures registers 28 and 30 (at step 50 of FIG. 2) to accommodate four 16 bit words. At step 52, the back end subsystem 20 collects data samples S1–S4 from memory and a set of associates coefficients C1–C4. The CPU 22 packs the data samples S1–S4 into PCI register 28 sequentially as illustrated in FIG. 1. The CPU 22 also packs corresponding coefficients C1–C4 into PCI register 30. At step 56, the CPU 22 performs parallel common arithmetic instructions upon the data samples S1–S4 and coefficients C1–C4 simultaneously in accordance with the equation illustrated above to produce a value for pixel P2. The mathematical operation set forth in the above equation is carried out during a single clock cycle to form pixel P2. The CPU 22 unpacks (at step 58) the value for pixel P2 and stores pixel P2 in a display memory.

Figure 4:
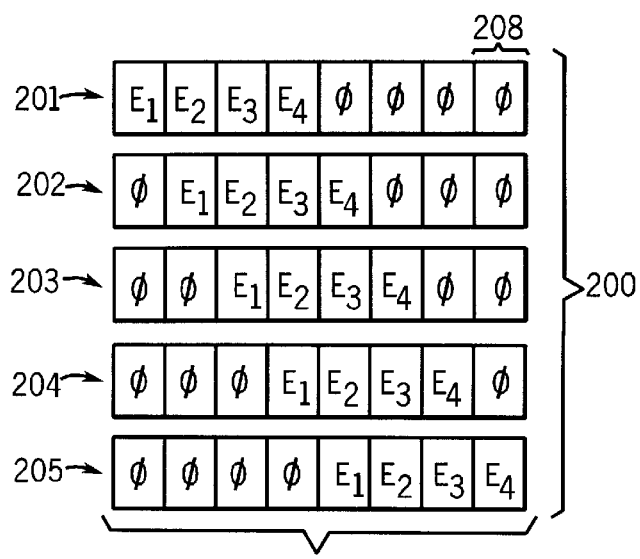
FIG. 4 illustrates a block of registers in a processor of an ultrasound system performing an auto-correlation operation according to a preferred embodiment of the present invention.
Figure 5:
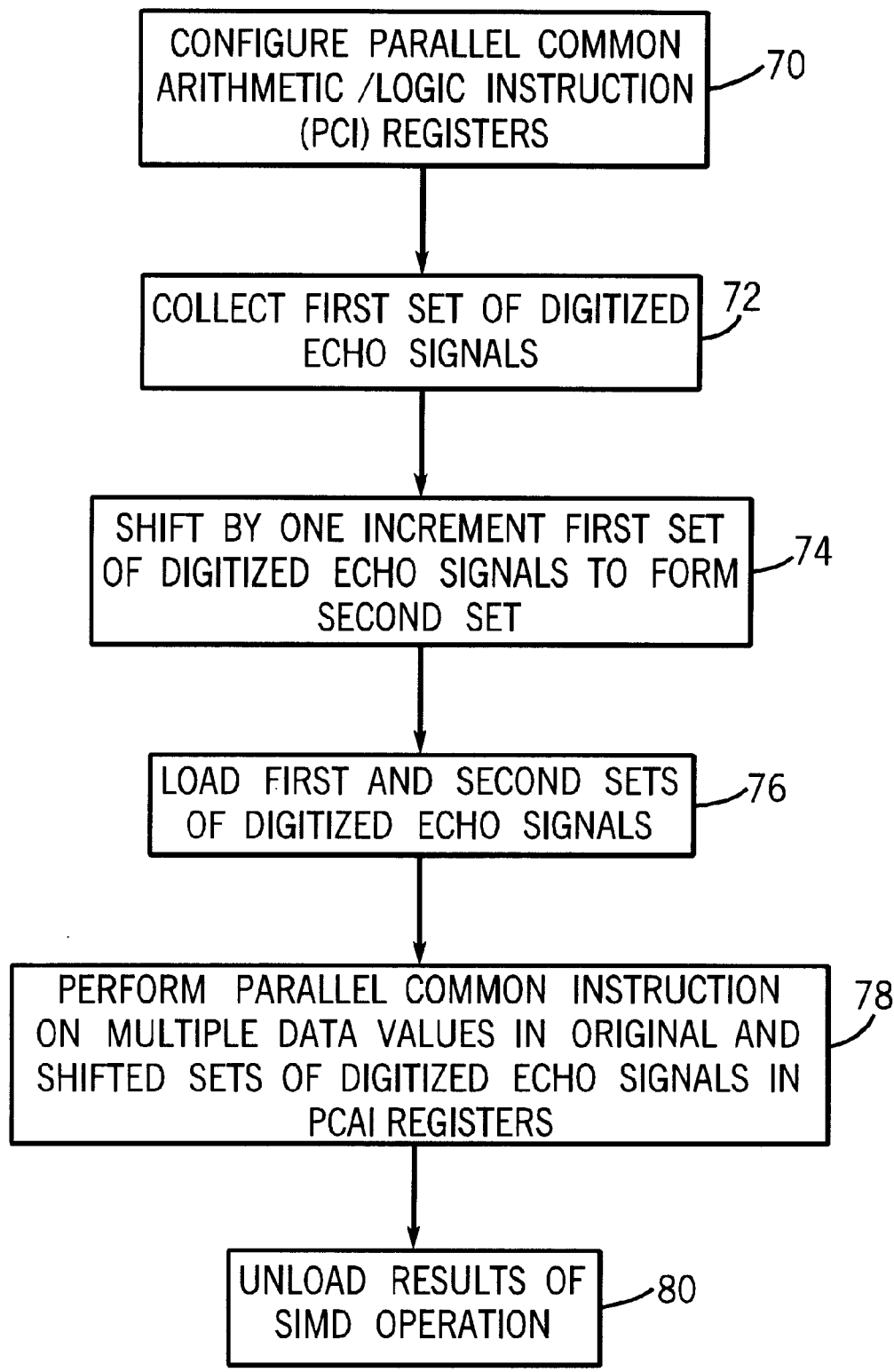
FIG. 5 illustrates a processing sequence carried out by an ultrasound system according to a preferred embodiment of the present invention to perform an auto-correlation operation.

Optionally the CPU 22 may be configured to carry out ultrasound autocorrelation operations as part of Color Doppler imaging. The CPU 22 may carry out both scan conversion and autocorrelation operations. An autocorrelation operation is described hereafter in connection with FIGS. 4 and 5. FIG. 4 illustrates an alternative embodiment according to the present invention whereby the CPU 22 is configured and operated to carry out an auto-correlation function in connection with ultrasound processing. FIG. 5 illustrates a flow chart of the processing sequence followed by the back end subsystem 20 to effect autocorrelation.

During Color Doppler imaging, the ultrasound system 10 acquires multiple data samples from a single physical location within the scan area. For example, to perform Color Doppler imaging, the transducer 14 transmits multiple ultrasound signals focused at position 118. The transducer 14 collects an equal number of echo signals from position 118 and digitizes the echo signals.

FIG. 4 illustrates a block 200 of PCI registers 201–205 in CPU 22. If each digital echo signal is an 8 bit value, then each register 201–205 may be configured to receive up to eight separate 8 bit data values 208. By way of example only, the ultrasound system 10 may carry out an auto-correlation function in order to carry out Color Doppler imaging at position 118 (FIG. 3) within the focal zone 120. In order to identify the Color Doppler for position 118, the back end subsystem 20 must perform auto-correlation upon each of the digitized echo signals received from position 118. The back end subsystem 20 receives a plurality of digitized echo signals denoted for this example by reference characters E1–E4 in FIG. 4.

To carry out auto-correlation, the back end subsystem 20 first configures the PCI registers 201–205 at step 70 in FIG. 5. Next, the back end subsystem 20 collects a set of digitized echo signals E1–E4 (step 72 in FIG. 5). The CPU 22 stores, in registers 201–205, parallel sets of the digitized echo signals E1–E4 wherein the set of digitized echo signals E1–E4 is positioned in registers 201–205 in a staggered or incremented manner as illustrated in FIG. 4 (step 74). At step 76, the multiple sets of digitized echo signals E1–E4 are packed into PCI registers 201–205 in a staggered manner as illustrates in FIG. 4. The digitized echo signals E1–E4 may not fill registers 201–205. Accordingly, no data values are packed in front of, and behind, the digitized echo signals E1–E4 within each of registers 201–205 as denoted by the zeros in FIG. 4.

At step 78, the CPU 22 performs parallel common arithmetic instructions upon the set of digitized echo signals E1–E4. For instance, the corresponding elements in registers 201 and 202 are multiplied and the products are summed (e.g., $E_1 \cdot nil + E_2 \cdot E_1 + E_3 \cdot E_2 + E_4 \cdot E_3 + nil \cdot E_4$). Once the CPU 22 carries out the parallel common arithmetic instructions upon the set of the digitized echo signals E1–E4, at step 80, the results of the arithmetic operation are unpacked or unloaded from the CPU 22. This operation is repeated for each set of digitized echo signals 122. The back end subsystem 20 then analyzes the results unpacked from registers 201–205 and identifies a Color Doppler image associated with position 118 to be used for subsequent ultrasound diagnostic operations.

Figure 6:
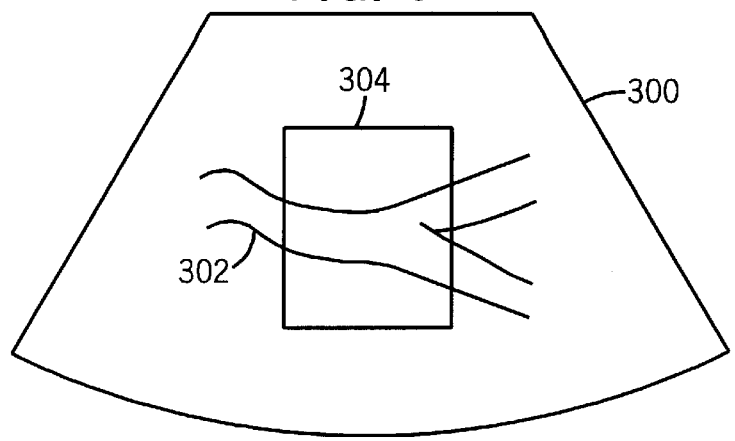
FIG. 6 illustrates a 2D sector scan image with a Color Doppler region of interest blended therewith according to a preferred embodiment of the present invention.
Figure 7:
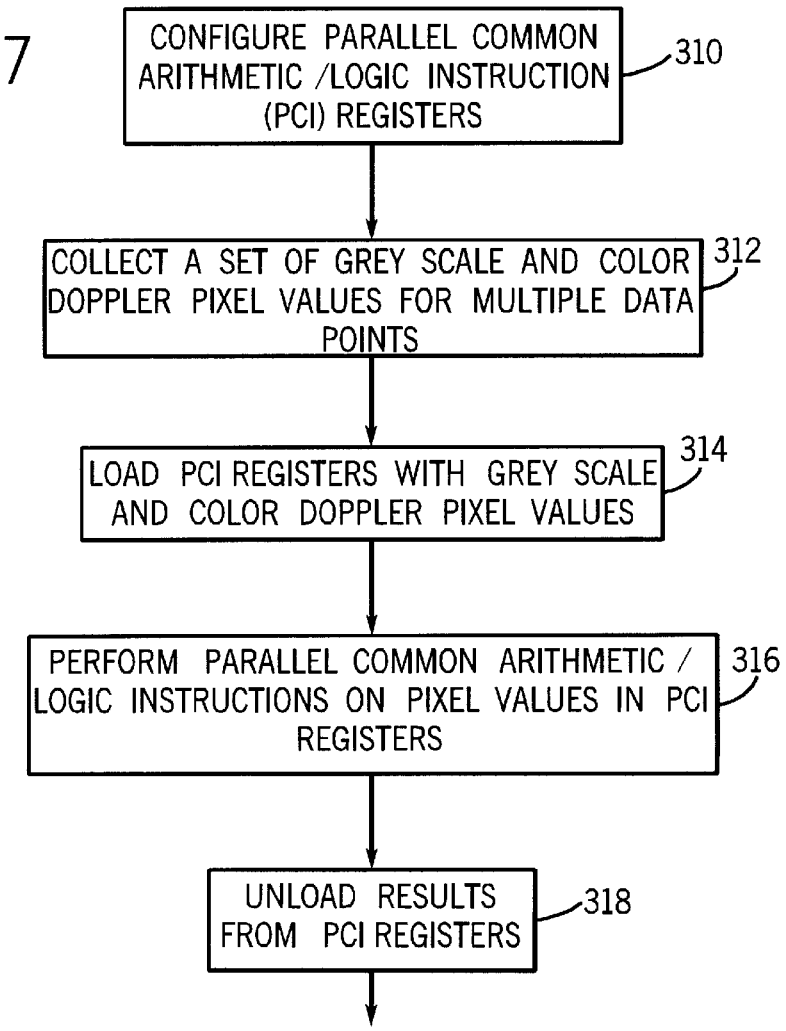
FIG. 7 illustrates a processing sequence carried out by an ultrasound system according to a preferred embodiment of the present invention to perform blending of 2D greyscale and Color Doppler images.

FIGS. 6 and 7 illustrate alternative embodiment in which the CPU 22 has been configured to perform a parallel blending operation between a black and white two-dimensional image (B-mode) and a Color Doppler image. FIG. 6 depicts a section scan image 300 illustrating a black and white two-dimensional image of a region within the patient scanned by the ultrasound system. In the example of FIG. 6, an artery 302 is illustrated having a branch within a rectangular region of interest 304 in the section scan image 300. The sector scan image 300 presents a black and white image formed of greyscale pixel values based upon the amplitude of echo signals received by the ultrasound system. The greyscale pixel values within the region of interest 304 are modified or replaced to illustrate color to denote the direction and speed of movement of tissue and/or blood flow, as is commonly used during Color Doppler imaging.

FIG. 7 illustrates a processing sequence carried out by the CPU 22 in order to display the two-dimensional black and white sector scan image 300 and the Color Doppler image within region 304 simultaneously (hereinafter referred to as blending).

FIG. 7 illustrates the processing sequence followed by the CPU 22 in connection with a blending operation. Beginning at step 310, the CPU 22 configures PCI registers 28 and 30 to perform parallel common logic instructions in connection with a plurality of greyscale and Color Doppler pixel values for multiple data points. For example, if PCI registers 28 and 30 are 64 bit registers, the CPU 22, at step 310, may configure such registers to each receive eight 8 bit pixel values. The greyscale pixel values represent a greyscale level associated with a black and white point within a B-mode two-dimensional image. The Color Doppler pixel values identify the red, green and blue content of the color pixel to be displayed within the region of interest 304. At step 312, the CPU collects a set of greyscale pixel values and a corresponding set of Color Doppler pixel values associated with multiple data points. For instance, if eight data points are to be processed simultaneous, at step 312, the CPU collects eight greyscale pixel and a corresponding eight Color Doppler pixel values.

At step 314 the CPU loads into the PCI registers 28 and 30 the greyscale and Color Doppler pixel values collected in step 312. For instance, the first register may receive eight greyscale pixel values while the second register receives eight Color Doppler pixel values. At step 316, the CPU performs a logical instruction upon the pixel values in the first and second PCI registers 28 and 30. As explained above, the CPU performs the same logical instruction in parallel upon each of the pixel values loaded in the PCI registers 28 and 30 in order to combine or blend the B-mode and Color Doppler information.

Several blending techniques exist for combining black and white B-mode data and Color Doppler data for pixel values. By way of example only, one technique includes a logical comparison of the intensities of the greyscale and Color Doppler pixel values for each point within the region of interest. The pixel of greater intensity may be displayed. For instance, step 316 may compare each greyscale pixel value intensity with the associated Color Doppler pixel value intensity. The CPU 22 may display the greyscale pixel value if its intensity is greater than that of the associated Color Doppler pixel. Alternatively, the CPU 22 may display the Color Doppler pixel value when the Color Doppler pixel value intensity exceeds the greyscale pixel. Once the logical comparison is complete, the CPU 22 stores in one of registers 28 and 30 logical zeros and ones (i.e., yes or no) associated with each of the simultaneous comparisons. The logical zero or logical one identifies which of the greyscale and Color Doppler pixel values are to be displayed for the corresponding data point. Once the parallel common logic instructions are complete at step 316, the results of the comparison are unloaded at step 318 in order to identify which of the greyscale and Color Doppler pixel values are to be displayed. The selection is performed as a parallel masking operation.

Optionally, the greyscale and/or Color Doppler pixel values may be multiplied by a scale factor prior to the comparison. For instance, the Color Doppler pixel values may be required to be two times greater than the greyscale pixel values before being displayed.

The foregoing blending technique described in connection with FIGS. 6 and 7 only displays, for each pixel, one of the greyscale or the Color Doppler values. Alternatively, a blending technique may be utilizes which combines the greyscale and Color Doppler information to form a modified pixel value. In this alternative blending technique, the greyscale information is diluted with the color information. Each greyscale pixel and Color Doppler pixel value may comprise three separate components associated with red, green and blue color components which collectively define the level of the greyscale value or the color of the Color Doppler value. For instance, a very light greyscale value may include red, green and blue components of low, but equal intensity. For a red color pixel value, the red component may be very large, while the blue and green components equal zero. During this alternative blending technique, the red, green and blue components of each greyscale and Color Doppler pixel value are arithmatically combined to form a resulting modified pixel value to be displayed. In this alternative blending technique, the steps of FIG. 7 are repeated. However, within step 316, the parallel common instruction is modified to perform an arithmatic operation, not a logic operation, whereby red, green and blue components of corresponding greyscale and color pixel values are combined arithmatically (e.g. multiplied, added or the like).

Alternatively, a thresholding may be utilized whereby Color Doppler information is compared with a threshold and entirely eliminated if it does not exceed the threshold. The thresholding technique follows the steps of FIG. 7, except that at step 312 threshold values are loaded in the first PCI register, not greyscale values. At step 316, the threshold values in the first PCI register are compared with the Color Doppler pixel values in the second PCI register. If the Color Doppler pixel values exceed the corresponding thresholds, then the Color Doppler pixel values may either be displayed or utilized in connection with the first or second blending techniques described above to be combined with greyscale information.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An ultrasound diagnostic system comprising:
a front end subsystem for transmitting ultrasound signals to an area of interest in a patient and receiving echo signals from the area of interest; and
a back end subsystem receiving ultrasound data points representative of the echo signals from the front end subsystem, said back end subsystem having a microprocessor for processing said ultrasound data points to produce an ultrasound image of the area of interest, said microprocessor having a first register that simultaneously holds at least two ultrasound data points, said first register performing at least one of parallel common scan conversion operations and parallel common Doppler signal processing operations upon said at least two ultrasound data points.

2. The ultrasound diagnostic system of claim 1, wherein said first register of said microprocessor is separately configured to store first and second different data types of ultrasound data points when performing scan conversion and Doppler signal processing operations, respectively, said first and second different data types being selected from the data types including eight 8 bit data points, four 16 bit data points and two 32 bit data points.

3. The ultrasound diagnostic system of claim 1, wherein said microprocessor includes a second register that simultaneously holds at least two coefficients associated with said at least two ultrasound data points, said microprocessor performing in parallel a common arithmetic scan conversion operation upon said at least two ultrasound data points and associated coefficients.

4. The ultrasound diagnostic system of claim 1, wherein said microprocessor includes a second register holding at least two additional ultrasound data points, said microprocessor performing in parallel a common Doppler signal processing operation upon said at lest two ultrasound data points and said at least two additional ultrasound data points.

5. The ultrasound diagnostic system of claim 1, wherein said microprocessor performs a scan conversion operation that converts ultrasound data points arranged in polar coordinates to ultrasound display pixel values arranged in Cartesian coordinates.

6. The ultrasound diagnostic system of claim 1, wherein said microprocessor performs parallel Doppler signal processing and parallel scan conversion operations upon said at least two data points in said first register.

7. The ultrasound diagnostic system of claim 1, wherein said microprocessor performs parallel autocorrelation operations upon said at least two ultrasound data points in said first register during Color Doppler signal processing.

8. The ultrasound diagnostic system of claim 1, wherein said microprocessor performs parallel blending operations to blend two-dimensional and color images.

9. The ultrasound diagnostic system of claim 8, wherein said microprocessor performs said blending operations based on logical comparisons of said two-dimensional and color images.

10. The ultrasound diagnostic system of claim 1, wherein said microprocessor performs parallel threshold operations on color images.

11. The ultrasound diagnostic system of claim 1, wherein said microprocessor performs common parallel operations upon said at least two ultrasound data points during a single clock cycle.

12. A method for processing ultrasound diagnostic information, comprising:

obtaining data points representative of ultrasound echo signals reflected from an area of interest in a patient;

storing simultaneously at least two ultrasound data points in a first register in a microprocessor; and processing simultaneously at least one of parallel common scan conversion and Doppler signal processing instructions by the microprocessor upon said at least two ultrasound data points stored in the first register.

13. The method of claim 12, further comprising:

performing parallel common Doppler signal processing arithmetic ultrasound operations upon said at least two ultrasound data points stored in the first register to produce at least two ultrasound processed data values.

14. The method of claim 12, further comprising:

storing simultaneously at least two ultrasound data points in a second register in a microprocessor; and performing in parallel a common logic instruction upon said at least two ultrasound data points.

15. The method of claim 12, further comprising:

configuring the first register to store ultrasound data points having a first data type for scan conversion operations and a second data type for non-scan conversion operations, said first and second data types being selected from three data types including eight 8 bit data points, four 16 bit data points and two 32 bit data points.

16. The method of claim 12, further comprising:

storing simultaneously at least two coefficients in a second register of the microprocessor; and performing parallel scan conversion arithmetic instructions upon said at least two ultrasound data points and associated coefficients to convert said ultrasound data points from a polar coordinate arrangement to a Cartesian coordinate arrangement.

17. The method of claim 12, wherein said processing step performs both Doppler signal processing and scan conversion on said ultrasound data points.

18. The method of claim 12, further comprising:

loading said at least two ultrasound data points into a second register in a shifted position with respect to a position of said at least two ultrasound data points in said first register.

19. A method according to claim 12, wherein said processing step carries out auto-correlation operations upon said at least two ultrasound data points according to a Color Doppler algorithm.

20. A method according to claim 12, wherein said processing step carries out beamforming operations upon said at least two ultrasound data points before performing at least one of scan conversion and Doppler signal processing operations.

21. The method of claim 12, further comprising:

performing parallel blending operations to blend B-mode 2D and color images.

22. The method of claim 21, further comprising:

performing blending operations based on logical comparisons of said B-mode 2D and color images.

23. The method of claim 12, further comprising:

performing parallel threshold operations upon color images.

24. In an ultrasound diagnostic apparatus, a subsystem for scan converting ultrasound data points from polar coordinates to Cartesian coordinates, the ultrasound data points representing ultrasound echo signals from an area of interest in a patient, said subsystem comprising:

memory storing ultrasound data points corresponding to echo signals from ultrasound data points in the area of interest, said memory storing said ultrasound data points arranged in a polar coordinate system with respect to a point proximate a surface of the patient corresponding to a boundary of the area of interest;

a microprocessor for scan converting ultrasound data points from a polar coordinate system to a Cartesian coordinate system, said microprocessor performing single instruction, multiple data set operations upon at least two ultrasound data points to carryout a scan conversion operation; and memory storing scan converted ultrasound data points arranged in a cartesian coordinate system with respect to a display.

25. The ultrasound diagnostic subsystem of claim 24, wherein said microprocessor includes a first register configured to store ultrasound data points having one of at least three data types, said three data types including eight 8 bit data points, four 16 bit data points and two 32 bit data points.

26. The ultrasound diagnostic subsystem of claim 24, wherein said microprocessor includes first and second registers that simultaneously hold at least two ultrasound data points and at least two coefficients associated with said at least two ultrasound data points, respectively, said microprocessor performing in parallel single instruction, multiple data set operations upon said at least two ultrasound data points and associated coefficients.

27. The ultrasound diagnostic subsystem of claim 24, wherein said single instruction, multiple data set operations performed by said microprocessor include a scan conversion operation to convert ultrasound data points arranged in polar coordinates to ultrasound display pixel values arranged in Cartesian coordinates.

28. The ultrasound diagnostic subsystem of claim 24, wherein said microprocessor performs single instruction, multiple data set operations upon at least two data points in a first register in said microprocessor to perform Doppler signal processing upon said ultrasound data points.

29. The ultrasound diagnostic subsystem of claim 24, wherein said microprocessor performs parallel autocorrelation operations upon said at least two ultrasound data points in a first register in said microprocessor during Color Doppler signal processing.

30. The ultrasound diagnostic subsystem of claim 24, wherein said microprocessor performs said single instruction, multiple data set operations upon said at least two ultrasound data points during a single clock cycle.

31. The ultrasound diagnostic subsystem of claim 24, wherein the microprocessor includes multi-media extension registers performing parallel scan conversion operations.

32. In an ultrasound apparatus, a subsystem for processing ultrasound data points representing ultrasound echo signals from an area of interest in a patient, the subsystem comprising:

memory storing ultrasound data points; and a microprocessor for performing Color Doppler signal processing upon the ultrasound data points to form processed data values, said microprocessor simultaneously performing single instruction, multiple data set operations upon at least two data points to carry out a Color Doppler signal processing operation and to provide the processed data values.

33. The ultrasound diagnostic subsystem of claim 32, wherein said microprocessor includes a first register configured to store ultrasound data points having one of at least three data types, said three data types including eight 8 bit data points, four 16 bit data points and two 32 bit data points.

34. The ultrasound diagnostic subsystem of claim 32, wherein said microprocessor includes first and second registers reconfigurable to simultaneously hold at least two ultrasound data points and at least two coefficients associated with said at least two ultrasound data points, respectively, said microprocessor performing in single instruction, multiple data set operations upon said at least two ultrasound data points and associated coefficients.

35. The ultrasound diagnostic subsystem of claim 32, wherein said single instruction, multiple data set operations performed by said microprocessor include a scan conversion operation to convert ultrasound data points arranged in polar coordinates to ultrasound display pixel values arranged in Cartesian coordinates.

36. The ultrasound diagnostic subsystem of claim 32, wherein said microprocessor performs parallel scan conversion operations upon at least two data points in a first register in said microprocessor to scan convert ultrasound data points in parallel from polar coordinates to Cartesian coordinates.

37. The ultrasound diagnostic subsystem of claim 32, wherein said microprocessor uses single instruction, multiple data set operations to perform parallel autocorrelation operations upon said at least two ultrasound data points in a first register in said microprocessor during Color Doppler signal processing.

38. The ultrasound diagnostic subsystem of claim 32, wherein said microprocessor performs said single instruction, multiple data set operations upon said at least two ultrasound data points during a single clock cycle.

39. The ultrasound diagnostic subsystem of claim 32, wherein the microprocessor includes multi-media extension registers performing parallel scan conversion operations.

* * * * *